United States Patent
Kapila et al.

(10) Patent No.: US 12,346,170 B1
(45) Date of Patent: Jul. 1, 2025

(54) TECHNOLOGIES FOR ILLUMINATION OF INPUT/OUTPUT PORTS ON A COMPUTE DEVICE

(71) Applicant: Intel Corporation, Santa Clara, CA (US)

(72) Inventors: Smit Kapila, Bangalore (IN); Varshini Ajjampur Vijayakumar, Bangalore (IN); Prakash Kurma Raju, Bangalore (IN); Jeff Ku, Taipei (TW); Sean J. W. Lawrence, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/399,495

(22) Filed: Dec. 28, 2023

(51) Int. Cl.
*G08B 21/00* (2006.01)
*G06F 1/16* (2006.01)
*G06F 3/02* (2006.01)

(52) U.S. Cl.
CPC .......... *G06F 1/1656* (2013.01); *G06F 1/1662* (2013.01); *G06F 3/02* (2013.01); *G06F 1/1616* (2013.01)

(58) Field of Classification Search
CPC ......... G06F 1/1656; G06F 1/1662; G06F 3/02
See application file for complete search history.

(56) References Cited

U.S. PATENT DOCUMENTS

| | | | | |
|---|---|---|---|---|
| 6,839,780 | B2* | 1/2005 | Brebner | H04B 10/801 710/63 |
| 2003/0000817 | A1* | 1/2003 | Farage | G06F 3/0202 200/314 |
| 2006/0007161 | A1 | 1/2006 | Knox et al. | |
| 2006/0044148 | A1* | 3/2006 | Daniels | G06F 1/1684 340/572.1 |
| 2009/0067153 | A1 | 3/2009 | Takeda et al. | |
| 2019/0324496 | A1 | 10/2019 | Cherukkate et al. | |

OTHER PUBLICATIONS

"Dual 4.2A USB Car Charger Power Outlet Adapter Socket, Waterproof 4-Port USB Charger Socket Fast Charging USB Port with Panel Mount for 12V/24V Car Boat Marine Motorcycle RV Truck." Https://Www.Amazon.Com/Charger-Adapter-Waterproof-Charging-Motorcycle/Dp/B07V6B3V4V/, Apr. 4, 2024. (5 pages).

* cited by examiner

*Primary Examiner* — Elmito Breval
(74) *Attorney, Agent, or Firm* — Alliance IP, LLC (57) ABSTRACT

Techniques for illumination of input/output (I/O) ports on a compute device are disclosed. In an illustrative embodiment, microholes are defined in a chassis around an opening in the chassis for an I/O port. A light-emitting diode (LED) contained within the chassis can shine light on the microholes, which can pass through the microholes. A user of the compute device can see the light through the microholes, allowing the user to identify the location and type of the I/O port, even in dark or low-light conditions. In some embodiments, the LEDs used to illuminate the microholes may be the same LEDs that illuminate the keys of the keyboard, simplifying the design, construction, and control of illumination of the microholes.

20 Claims, 10 Drawing Sheets

TECHNOLOGIES FOR ILLUMINATION OF INPUT/OUTPUT PORTS ON A COMPUTE DEVICE

BACKGROUND

Compute devices such as laptops are often used in a variety of environments, including homes, offices, commercial environments, industrial environments, etc. Care is taken in the design of laptops to provide a good user experience. For example, as users may use a laptop in a dark or dimly lit environment, a backlight is often provided to illuminate around the keys of a keyboard, making the keys visible even in a dark environment.

Laptops and other compute devices often have input/output ports, such as Universal Serial Bus (USB) ports, High-Definition Multimedia Input (HDMI) ports, audio ports, etc. Making identification of the appropriate port easier and making inserting plugs into the ports easier can be part of providing a good user experience.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

In various embodiments disclosed herein, a compute device may include a chassis with openings for several input/output (I/O) ports. Around the I/O ports, several microholes may be distributed. Light-emitting diodes (LEDs) in the compute device can illuminate the microholes. In use, the LEDs can illuminate the microholes, making it easier for users to identify the appropriate port and insert plugs into the I/O ports and improving the overall user experience, particularly in low-light environments. In some embodiments, the LEDs used to illuminate the microholes may be the same as the LEDs used to illuminate the keyboard. Some of the advantages present in some of the embodiments disclosed within include a reduced bill of materials compared to a separate LED for each I/O port, no impact on chassis height due to LED placements in critical I/O port areas, no impact to system battery life, and no additional circuitry or firmware required to control the LEDs that illuminate the microholes around the I/O ports.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, electromagnetic radiation). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Optical components such as fibers or waveguides may be "connected" if the gap between them is small enough that light can be transferred from one fiber or waveguide to another fiber or waveguide without any intervening optical elements, such as a lens or mirror. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

The disclosed embodiments may be implemented, in some cases, in hardware, firmware, software, or any combination thereof. The disclosed embodiments may also be implemented as instructions carried by or stored on a transitory or non-transitory machine readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Figure 1:
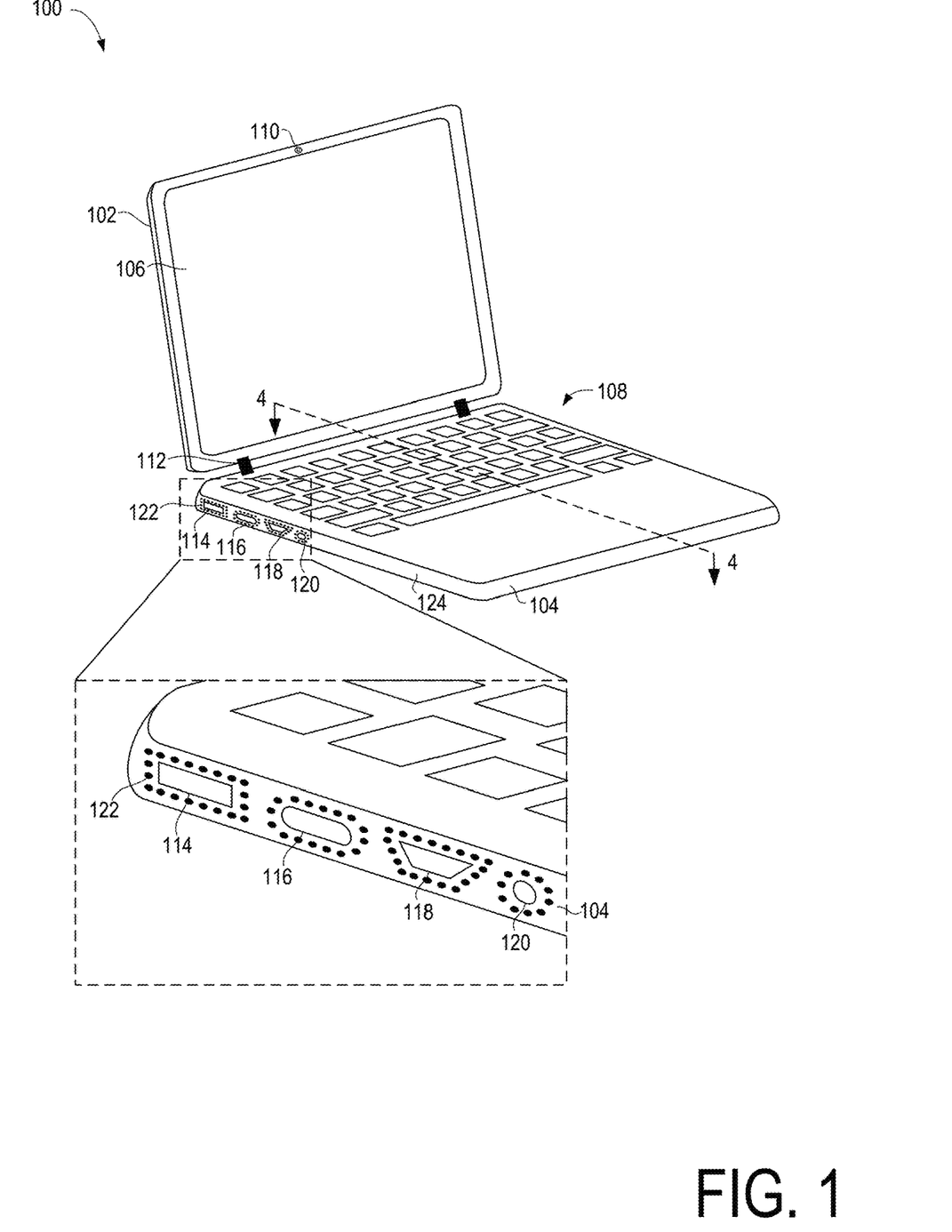
FIG. 1 is a simplified drawing of one embodiment of a compute device with input/output (I/O) ports that can be illuminated.

Referring now to FIG. 1, an illustrative compute device 100 includes a lid portion 102 and a base portion 104. The lid portion 102 includes a display 106, and the base portion 104 includes a keyboard 108. The compute device 100 includes I/O ports 114, 116, 118, 120, and several microholes 122 around each of the I/O ports 114, 116, 118, 120.

Figure 2:
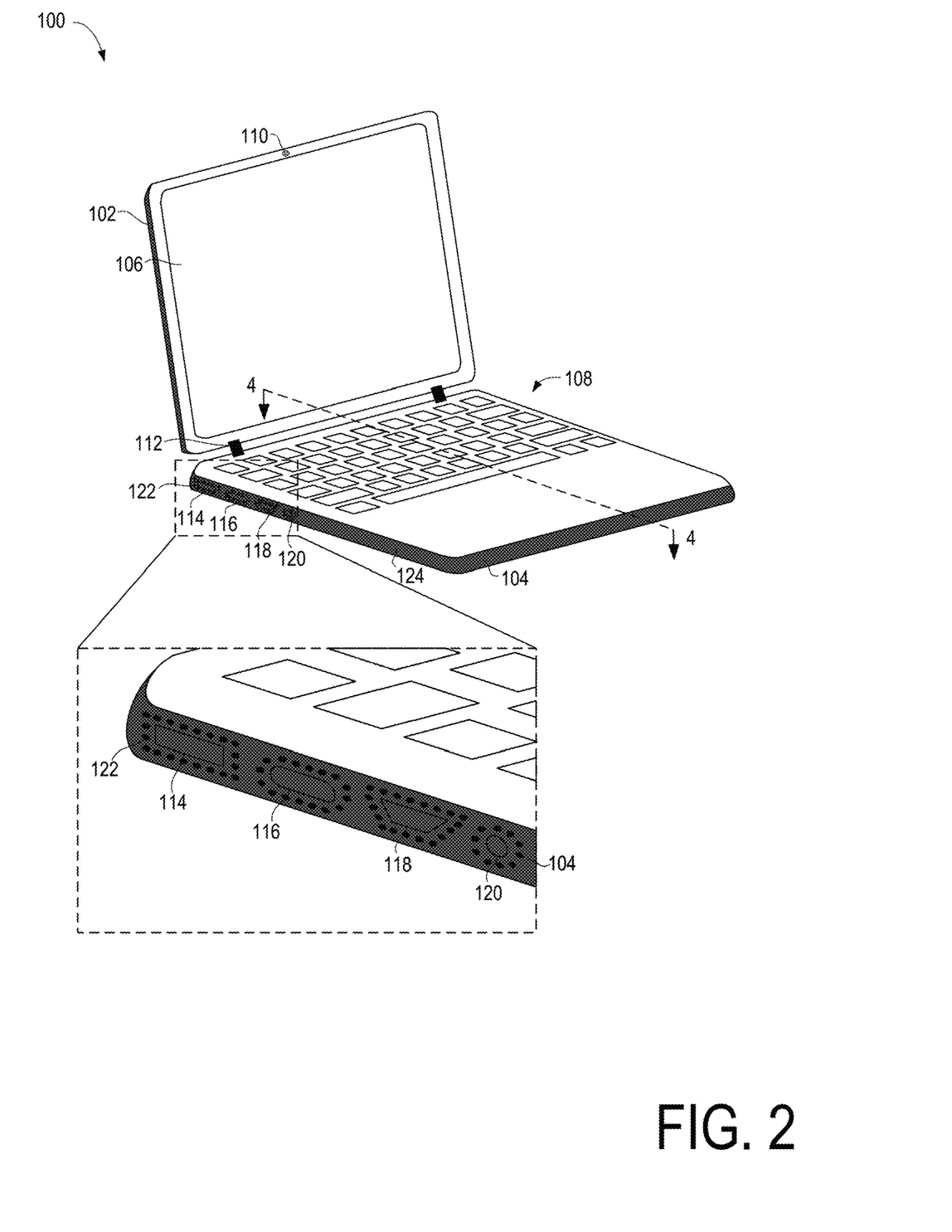
FIG. 2 is a simplified drawing of the compute device of FIG. 1 in a dark environment with the I/O ports not illuminated.
Figure 3:
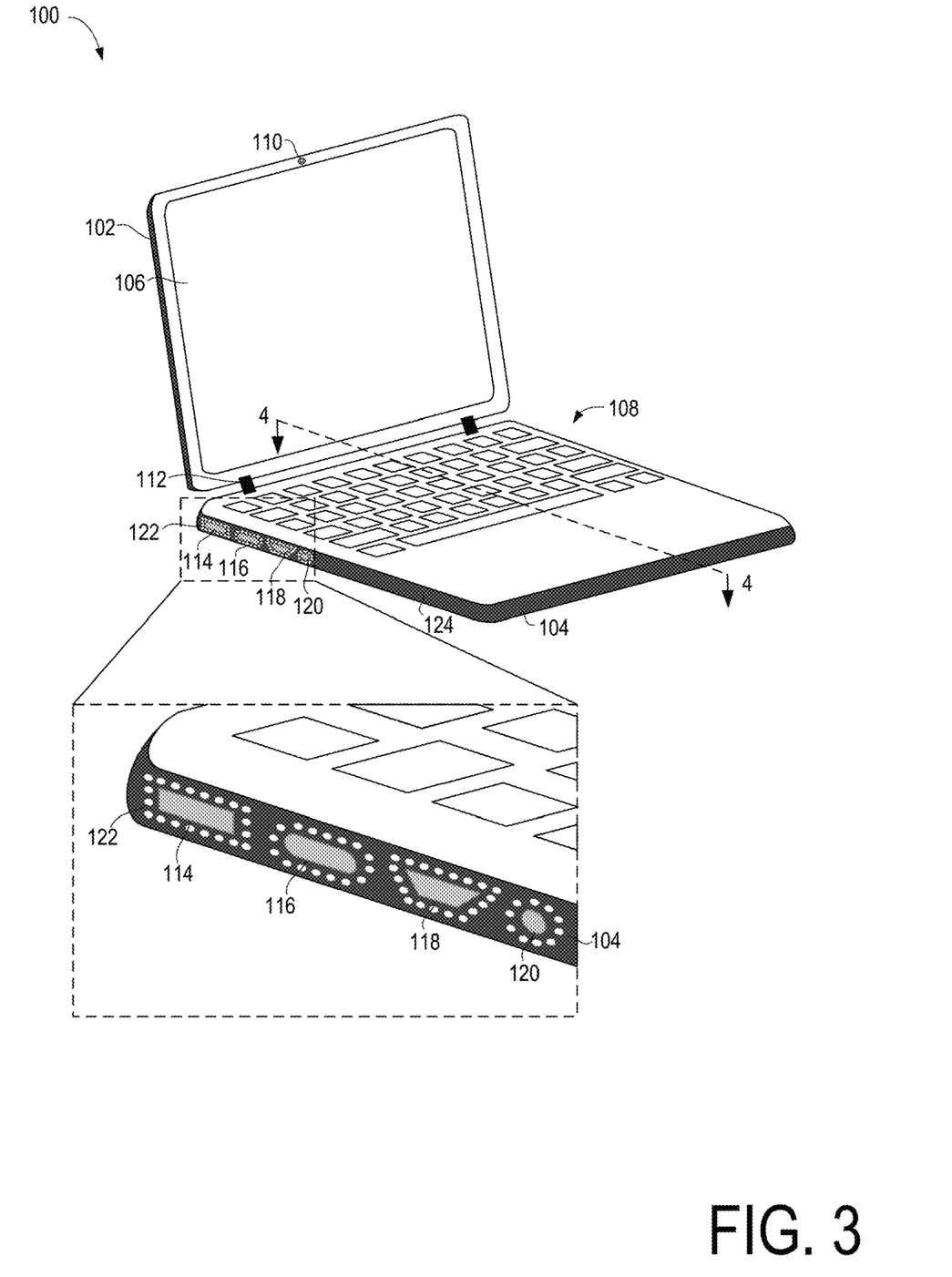
FIG. 3 is a simplified drawing of the compute device of FIG. 1 in a dark environment with the I/O ports illuminated.

In use, in some environments, the I/O ports 114, 116, 118, 120 may be difficult for a user to see, such as in dark or low-light environments. For example, FIG. 2 shows how the I/O ports 114, 116, 118, 120 may be difficult to see in low-light environments, even if, e.g., the display 106 is illuminating the keyboard 108 and the top of the base portion 104. To improve the visibility of the I/O ports 114, 116, 118, 120, LEDs 404 (see FIG. 4) can illuminate the microholes, as shown in FIG. 3, making the position of the I/O ports 114, 116, 118, 120 more visible to a user of the compute device 100.

The illustrative compute device 100 is embodied as a laptop with a clamshell configuration. The illustrative compute device 100 can be in an open configuration (shown in FIG. 1) or a closed configuration, with the lid portion 102 positioned on top of the base portion 104 with the display 106 facing downwards toward the base portion 104. Additionally or alternatively, the compute device 100 may be embodied as a laptop with additional configurations. For example, the compute device 100 may be a laptop with a display that can rotate up to 360°, allowing the compute device 100 to be in a book configuration, a tablet configuration, etc. The compute device 100 may be a 2-in-1 device, with a lid portion 102 that can separate from the base portion 104. In the illustrative embodiment, one or more hinges 112 joins the base portion 104 and the lid portion 102. The lid portion 102, the base portion 104, and/or the lid portion 102 and base portion 104 together may be referred to as the chassis 102, 104 of the compute device 100.

The chassis 102, 104 of the compute device 100 may be made of any suitable material. For example, the chassis 102, 104 may be made of metal, plastic, and/or the like.

The illustrative lid portion 102 has a display 106. The display 106 may be any suitable size and/or resolution, such as a 5-18 inch display, with a resolution from 340×480 to 3820×2400. The display 106 may use any suitable display technology, such as LED, OLED, QD-LED, electronic paper display, etc. The display 106 may be a touchscreen display. The lid portion 102 may also include a camera 110. The camera 110 may include one or more fixed or adjustable lenses and one or more image sensors. The image sensors may be any suitable type of image sensors, such as a CMOS or CCD image sensor. The camera 110 may have any suitable aperture, focal length, field of view, etc. For example, the camera 110 may have a field of view of 60-110° in the azimuthal and/or elevation directions.

The I/O ports 114, 116, 118, 120 may be any suitable I/O ports for a compute device 100. For example, in an illustrative embodiment, the compute device 100 includes a Universal Serial Bus (USB) type A port 114, a USB type C port 116, a high-definition multimedia interface (HDMI) port 118, an audio port 120, and/or the like. In an illustrative embodiment, the I/O ports 114, 116, 118, 120 are positioned at a side 124 of the chassis 104, and openings are defined in the side 124 of the chassis for the I/O ports 114, 116, 118, 120. In one embodiment, microholes 122 may be approximately evenly spaced around the opening for each I/O port 114, 116, 118, 120. In other embodiments, the microholes 122 may have a different distribution, such as only placed along the sides of the opening for each I/O port 114, 116, 118, 120, unevenly spaced around the opening for each I/O port 114, 116, 118, 120, placed along the top, bottom, and/or sides of the opening for each I/O port 114, 116, 118, 120, and/or the like. The microholes 122 may have any suitable diameter, such as 50-500 micrometers. In some embodiments, more than one row of microholes 122 may be arranged around each I/O port 114, 116, 118, 120, such as 2-10 rows of microholes 122. In some embodiments, one or more elongated slots positioned around each I/O port 114, 116, 118, 120 may be used in addition to or in place of the microholes 122. Any suitable I/O port 114, 116, 118, 120 may be on the left side, right side, front side, or rear side of the chassis 104 and/or the chassis 102. In some embodiments, an I/O port 114, 116, 118, 120 may be combined with another functionality, such as power. For example, in one embodiment, a USB-C port 116 may be used to provide both I/O and power.

The LEDs 404 that illuminate the microholes 122 around the I/O ports 114, 116, 118, 120 may be turned on in any suitable manner. In one embodiment, the LEDs 404 are the same LEDs 404 that illuminate the keys of the keyboard 108 as a backlight, and the microholes 122 around the I/O ports 114, 116, 118, 120 are illuminated whenever the keyboard 108 is illuminated, such as any time a user presses a key. Additionally or alternatively, LEDs that illuminate the microholes 122 around the I/O ports 114, 116, 118, 120 may be activated based on, e.g., a trigger sound, a sensor determining that a user may be trying to insert a plug (such as a proximity sensor near the I/O ports 114, 116, 118, 120, a touch sensor near the I/O ports 114, 116, 118, 120, etc.), an indication from the operating system that a user may be trying to insert a plug, etc. In some embodiments, the LEDs 404 and other LEDs disclosed herein may be replaced or augmented with a different form of lighting, such as lasers, incandescent lights, fluorescent lights, etc.

Figure 4:
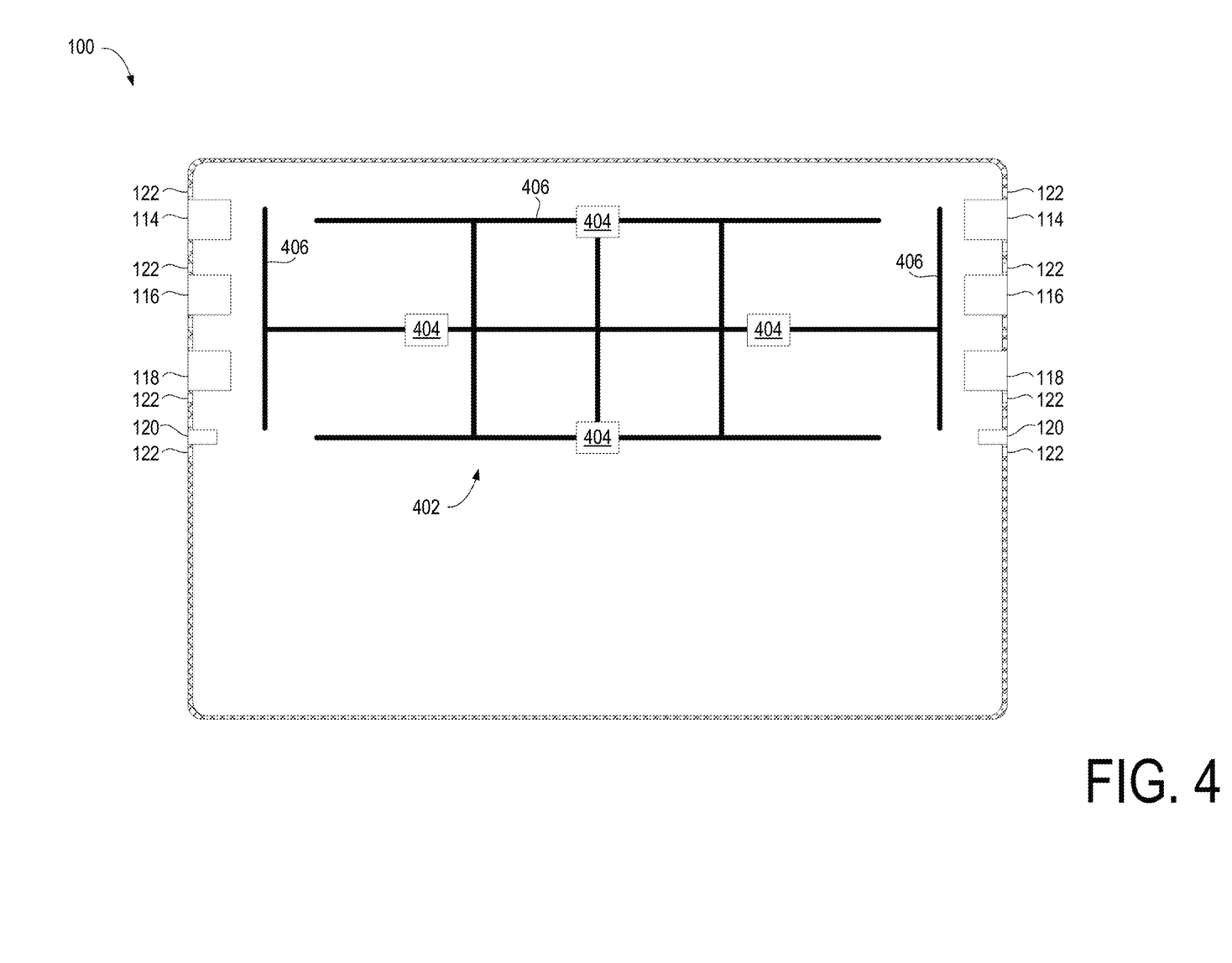
FIG. 4 is a top-down cross-sectional view of one embodiment of the compute device of FIG. 1, showing various components of the compute device including light-emitting diodes (LEDs) and light pipes.

Referring now to FIG. 4, a top-down view of a cross-section of the base 104 of the compute device 100 is shown. A lighting network 402 includes one or more LEDs 404 and one or more light pipes 406. The light pipes 406 are configured to carry light from the LEDs 404 and distribute it to different parts of the compute device 100. The illustrative light pipes 406 distribute light below the keyboard 108 and also to the microholes 122. The light pipes 406 may carry light using total internal reflection, and the light pipes 406 may emit light using, e.g., scattering, sections arranged not to provide total internal reflections, or emitting light at end faces of the light pipes 406. The light pipes 406 may be made of any suitable transparent material, such as glass, plastic, etc. In addition to the components shown in FIG. 4, the chassis 104 may contain other components, such as a processor, memory, circuitry for wireless communication, one or more storage devices, a battery, etc.

The LEDs 404 may be any suitable LEDs 404, such as blue or ultraviolet LEDs 404 with one or more phosphors to produce any suitable color or range of colors, including white. In some embodiments, each LED module 404 may include several diodes, which can create light at different wavelengths.

Figure 5:
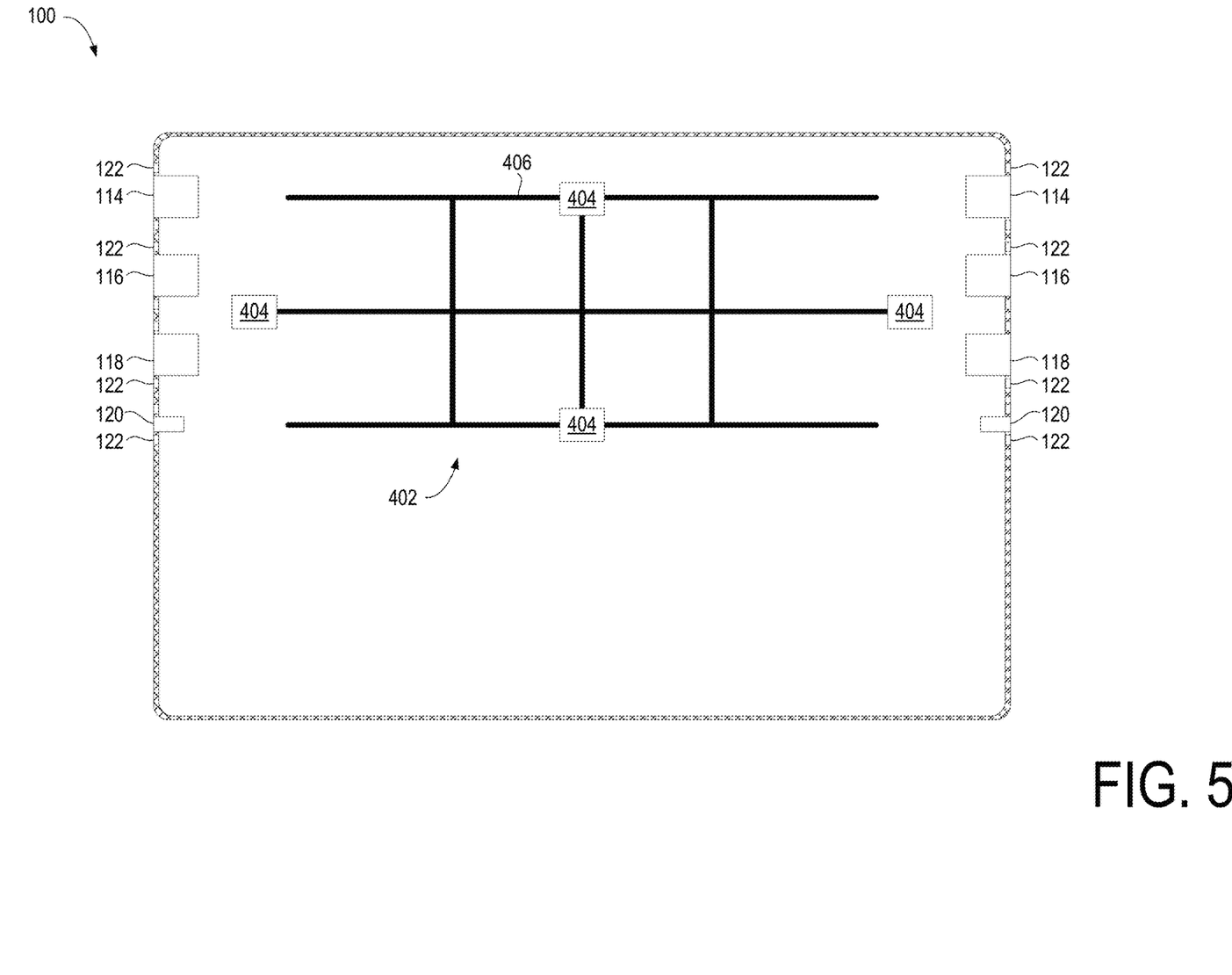
FIG. 5 is a top-down cross-sectional view of one embodiment of the compute device of FIG. 1, showing various components of the compute device including LEDs and light pipes.

In an illustrative embodiment, the same LEDs 404 used to backlight the keyboard 108 are used to light the microholes. The LEDs 404 may be in the same position as a design of a compute device 100 without the microholes 122. In other embodiments, other approaches may be used. For example, in FIG. 5, the LED 404 may be placed further towards the outer edge of the chassis 104, illuminating the microholes 122 directly (i.e., without a light pipe 406) and illuminating the keyboard 108 with a light pipe 406.

Figure 6:
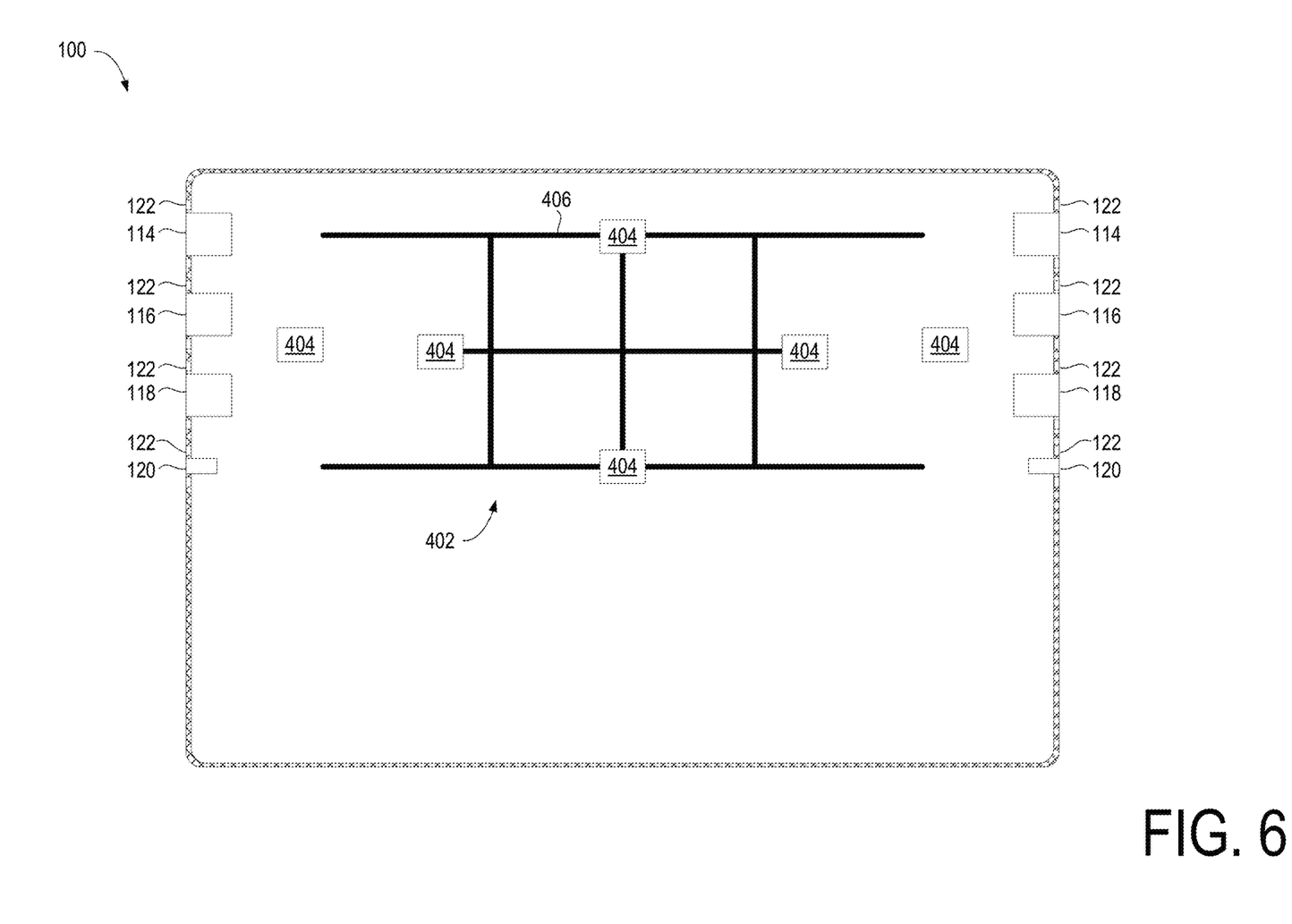
FIG. 6 is a top-down cross-sectional view of one embodiment of the compute device of FIG. 1, showing various components of the compute device including LEDs and light pipes.

It should be appreciated that other embodiments are envisioned as well. For example, in some embodiments, one or more LEDs 404 may be positioned near the microholes 122 without being attached to any light pipes 406, as shown in FIG. 6. In such embodiments, the LEDs 404 may be used to light the microholes 122 without being used to provide backlight for the keyboard 108, or the LEDs 404 may be used to both light the microholes 122 and provide backlight for the keyboard 108.

Figure 7:
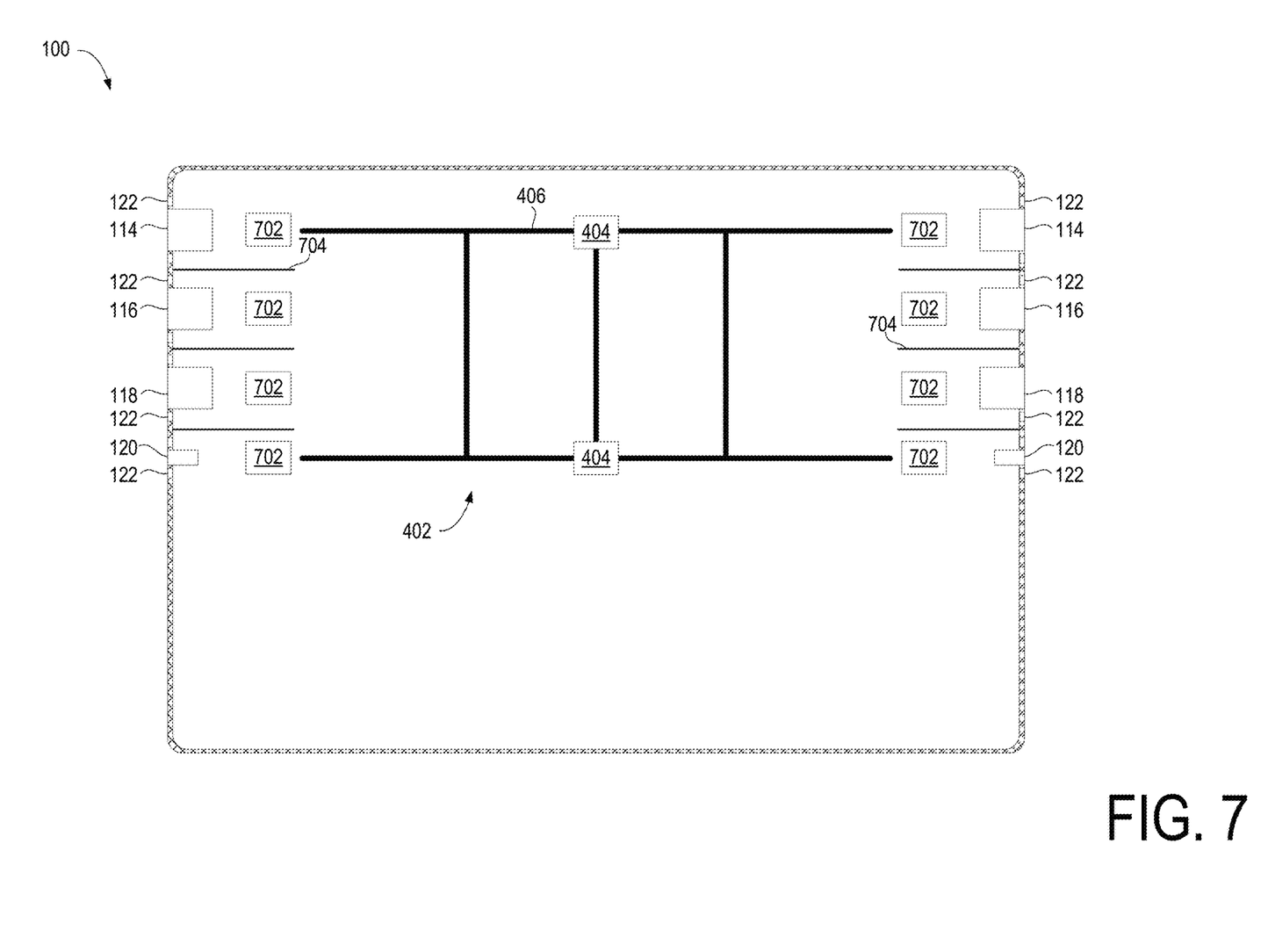
FIG. 7 is a top-down cross-sectional view of one embodiment of the compute device of FIG. 1, showing various components of the compute device including LEDs and light pipes.

In another embodiment, as shown in FIG. 7, a LED 702 may be used to illuminate the microholes 122 for one or some of the I/O ports 114, 116, 118, 120, and dividers 704 may be used to isolate the microholes 122 from being exposed to light from adjacent LEDs 702. In such an embodiment, the LEDs 702 may illuminate the microholes 122 for, e.g., one I/O port 114, 116, 118, 120, such as an I/O port 114, 116, 118, 120 that the operating system has instructed a user to insert a plug into or is otherwise expecting a user to insert a plug into. In some embodiments, a multicolor LED 702 may be used, and different I/O port 114, 116, 118, 120 may be illuminated using different colors, such as to show status, provide an indication to a user such an indication of a port 114, 116, 118, 120 to plug into, and/or the like.

Figure 8:
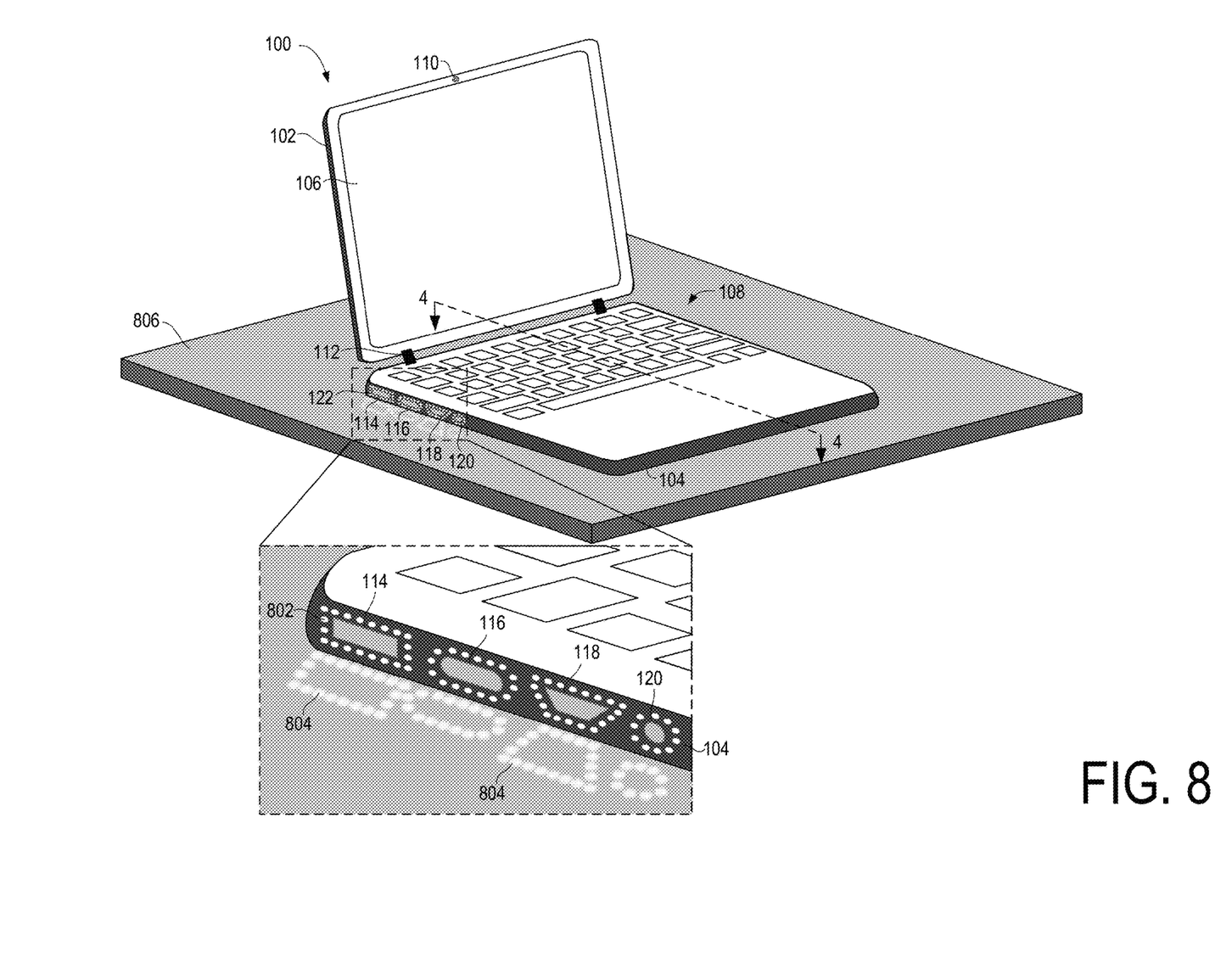
FIG. 8 is a simplified drawing of the compute device of FIG. 1 in a dark environment with the I/O ports illuminated with directional illumination.

In some embodiments, the microholes 122 in the chassis 104 may have inserts 802 of a transparent material such as glass or plastic with one or more curved or angled surfaces. The inserts 802 can refract or reflect the light from the LEDS 404, 702 downwards towards a surface 806 that the compute device 100 is located on, as shown in FIG. 8. In such an embodiment, a light pattern 804 may be shone on the surface 806, as shown in the figure, allowing for a user to more easily identify the I/O ports 114, 116, 118, 120.

It should be appreciated that the approaches described herein can provide several advantages. For example, in comparison to having a separate LED mounted immediately next to each I/O port 114, 116, 118, 120, having an LED 404, 702 illuminate the microholes 122 near the I/O ports 114, 116, 118, 120 can increase flexibility in the placement of the LEDs 404, 702, spacing them farther away from the critical I/O port area. In some cases, moving LEDs 404 farther away from the critical I/O port area may reduce the required height of the chassis 104. In some embodiments, the same LEDs 404 used to illuminate the keyboard 108 are used to illuminate the microholes 122, so illuminating the microholes 122 does not impact battery life and does not require any additional circuitry to control the LEDs 404.

Figure 9:
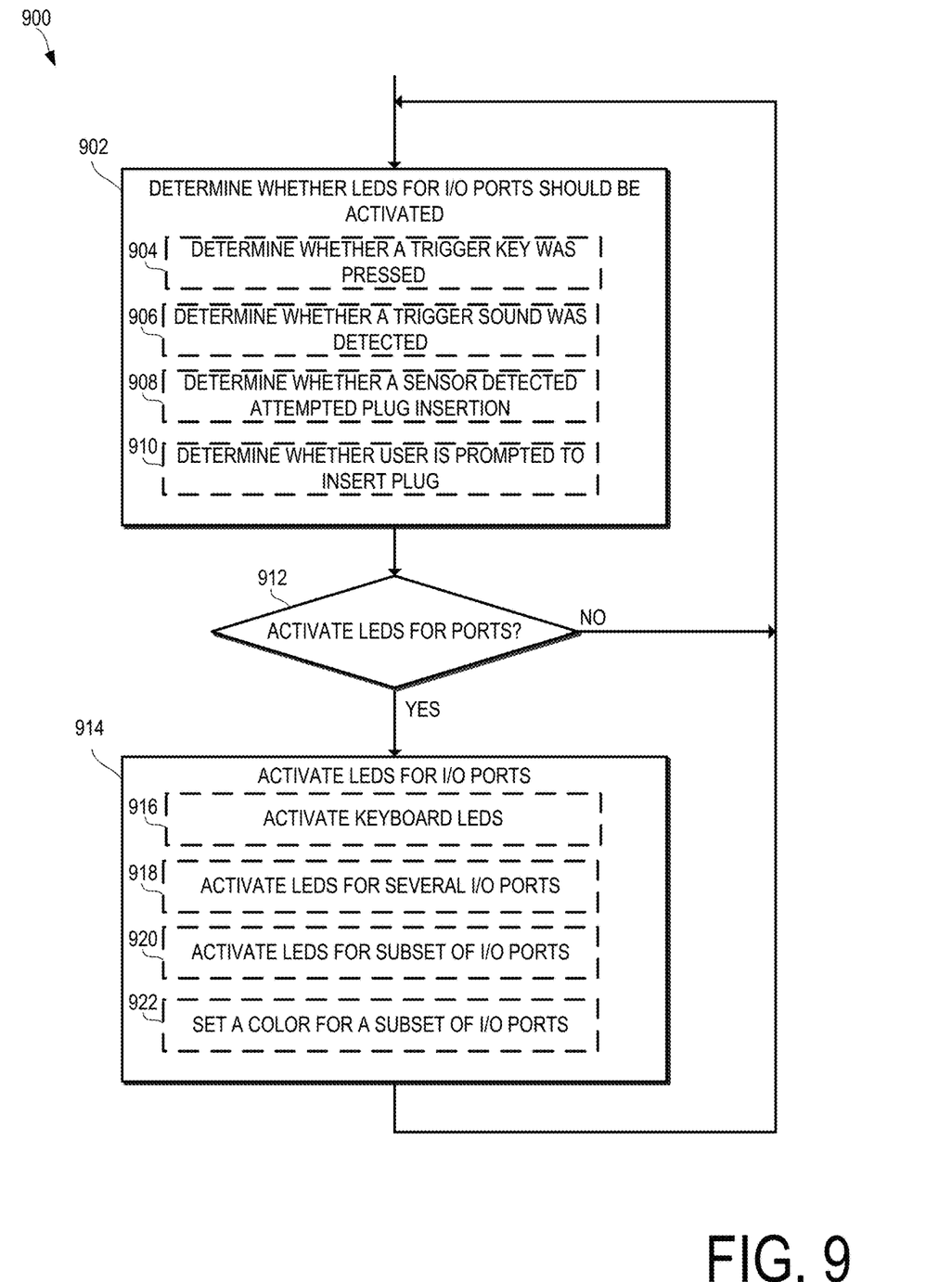
FIG. 9 is one embodiment of a flow chart for a method of illuminating the I/O ports of the compute device of FIG. 1.

Referring now to FIG. 9, in one embodiment, the compute device 100 may execute a method 900 for illuminating I/O ports 114, 116, 118, 120. The compute device 100 may execute the method using any suitable combination of, e.g., hardware, software, firmware, modules, circuitry, and/or the like. For example, the compute device 100 may include various modules, logic, and other components that may form a portion of, or otherwise be established by, a processor 1002, memory 1004, data storage 1008, or other hardware components of the compute device 100 (see FIG. 10). As such, in some embodiments, one or more of the modules of the compute device 100, such as an I/O port illumination module, may be embodied as circuitry or collection of electrical devices (e.g., I/O port illumination circuitry, etc.). It should be appreciated that, in such embodiments, one or more of the circuits (e.g., the I/O port illumination circuitry, etc.) may form a portion of one or more of the processor 1002, the memory 1004, the I/O subsystem 1006, the data storage 1008, and/or other components of the compute device 100. For example, in some embodiments, some or all of the modules may be embodied as the processor 1002 as well as the memory 1004 and/or data storage 1008 storing instructions to be executed by the processor 1002. Additionally, in some embodiments, one or more of the illustrative modules may form a portion of another module and/or one or more of the illustrative modules may be independent of one another. Further, in some embodiments, one or more of the modules of the compute device 100 may be embodied as virtualized hardware components or emulated architecture, which may be established and maintained by the processor 1002 or other components of the compute device 100. It should be appreciated that some of the functionality of one or more of the modules of the compute device 100 may require a hardware implementation, in which case embodiments of modules that implement such functionality will be embodied at least partially as hardware.

The method 900 begins in block 902, in which the compute device 100 determines whether the LEDs 404, 702 for the I/O ports 114, 116, 118, 120 should be activated. The compute device 100 may make such a determination in any suitable manner. For example, in block 904, the compute device 100 may determine whether a trigger key was pressed. A trigger key may be any suitable key or combination of keys. In some embodiments, any key may be a trigger key, and any time a user presses any key, the LEDs 404 may light up the keyboard 108 and/or the I/O ports 114, 116, 118, 120 for a pre-defined amount of time, such as 1-30 seconds. In another embodiment, a trigger key could be, e.g., control, a function key, a combination of two or more keys (which may include, a control key, a function key, an alt key, a special key, etc.), a long press of a key for more than, e.g., 1-5 seconds, etc. In another example, in block 906, the compute device 100 may determine whether a trigger sound is detected. A trigger sound may be, e.g., a user saying a keyword, a user saying anything, any sound above a threshold sound amplitude being detected, any sound above a threshold sound amplitude being detected near the I/O ports 114, 116, 118, 120, etc. In another example in block 908, the compute device 100 may determine whether a sensor detected an attempted or possible plug insertion, such as a proximity sensor near the I/O ports 114, 116, 118, 120, a pressure sensor near the I/O ports 114, 116, 118, 120, etc. In another example, in block 910, the compute device 100 may determine whether a user is prompted to insert a plug, such as when configuring a new device. In all of those examples, the compute device 100 may determine that LEDs 404 and/or LEDs 702 should be activated, as appropriate.

In block 912, if the compute device 100 is not to activate the LEDs 404, 702, the method 900 loops back to block 902 to again check for whether the LEDs 404, 702 should be activated. If the compute device 100 is to activate the LEDs 404, 702, the method 900 proceeds to block 914, in which the compute device 100 activates the LEDs 404, 702 for the I/O ports 114, 116, 118, 120. In block 916, in embodiments in which the LEDs 404 used to illuminate the keyboard 108 are also used to illuminate the microholes 122, the compute device 100 activates the LEDs 404 used to illuminate the keyboard 108. In block 918, the compute device 100 may activate LEDs 404, 702 for several the I/O ports 114, 116, 118, 120, such as all of the I/O ports 114, 116, 118, 120. In block 920, in some embodiments, the compute device 100 may activate LEDs 702 for a subset of the I/O ports 114, 116, 118, 120, such as one I/O port 114, 116, 118, 120. The dividers 704 may be used to isolate light from the LED 702 for the selected I/O port 114, 116, 118, 120 from the other I/O ports 114, 116, 118, 120. In block 922, in some embodiments, the compute device 100 may set a color for a subset of the I/O ports 114, 116, 118, 120, such as one I/O port 114, 116, 118, 120. A color may be used to indicate a particular I/O port 114, 116, 118, 120, show a status of one or more of the I/O ports 114, 116, 118, 120, etc. In each case, the LEDs 404, 702 may be turned on for any suitable amount of time, such as 1-30 seconds. In some cases, the LEDs 404, 702 may be turned on until they are turned off, such as when an LED 404, 702 is activated to show the status of an I/O port 114, 116, 118, 120. The method 900 then loops back to block 902 to again determine if the LEDs 404, 702 for the I/O ports 114, 116, 118, 120 should be activated.

Figure 10:
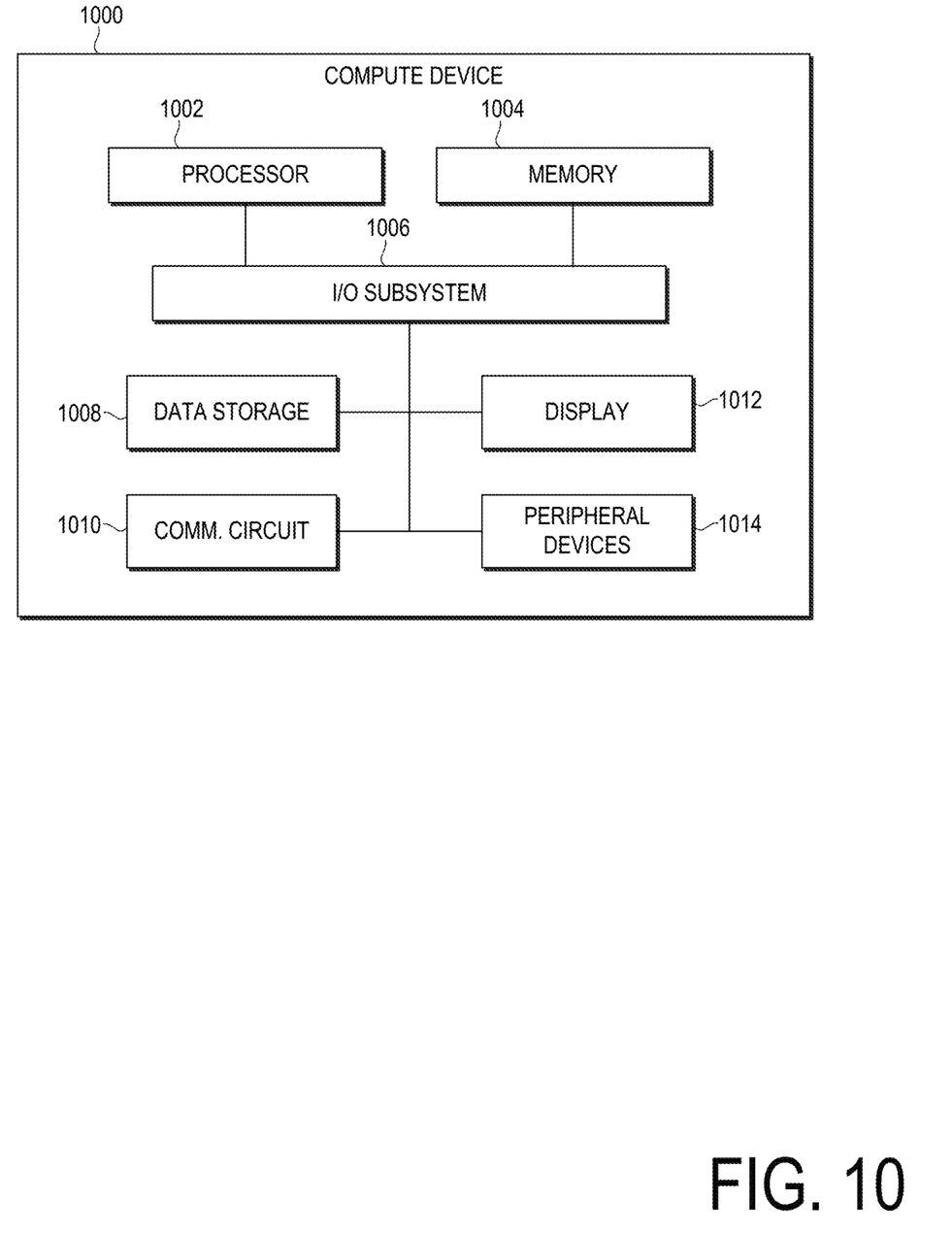
FIG. 10 is a simplified block drawing of at least one embodiment of a compute device.

Referring now to FIG. 10, in one embodiment, a compute device 1000 is shown. The compute device 1000 may be embodied as any suitable embodiment of the compute device 100 described above and may include one or more LEDs 404, 702, light pipes 406, transparent inserts 802, etc. The compute device 1000 may be embodied as any type of compute device. For example, the compute device 1000 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a networked computer, a wearable computer, a handset, a messaging device, a camera device, and/or any other compute device. In some embodiments, the compute device 1000 may be located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

The illustrative compute device 1000 includes a processor 1002, a memory 1004, an input/output (I/O) subsystem 1006, data storage 1008, a communication circuit 1010, a display 1012, and one or more peripheral devices 1014. In some embodiments, one or more of the illustrative components of the compute device 1000 may be incorporated in, or otherwise form a portion of, another component. For example, the memory 1004, or portions thereof, may be incorporated in the processor 1002 in some embodiments. In some embodiments, one or more of the illustrative components may be physically separated from another component.

The processor 1002 may be embodied as any type of processor capable of performing the functions described herein. For example, the processor 1002 may be embodied as a single or multi-core processor(s), a single or multi-socket processor, a digital signal processor, a graphics processor, a neural network compute engine, an image processor, a microcontroller, or other processor or processing/controlling circuit. Similarly, the memory 1004 may be embodied as any type of volatile or non-volatile memory or data storage capable of performing the functions described herein. In operation, the memory 1004 may store various data and software used during operation of the compute device 1000 such as operating systems, applications, programs, libraries, and drivers. The memory 1004 is communicatively coupled to the processor 1002 via the I/O subsystem 1006, which may be embodied as circuitry and/or components to facilitate input/output operations with the processor 1002, the memory 1004, and other components of the compute device 100. For example, the I/O subsystem 1006 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. The I/O subsystem 1006 may connect various internal and external components of the compute device 1000 to each other with use of any suitable connector, interconnect, bus, protocol, etc., such as an SoC fabric, PCIe®, USB2, USB3, USB4, NVMe®, Thunderbolt®, and/or the like. In some embodiments, the I/O subsystem 1006 may form a portion of a system-on-a-chip (SoC) and be incorporated, along with the processor 1002, the memory 1004, and other components of the compute device 100 on a single integrated circuit chip.

The data storage 1008 may be embodied as any type of device or devices configured for the short-term or long-term storage of data. For example, the data storage 1008 may include any one or more memory devices and circuits, memory cards, hard disk drives, solid-state drives, or other data storage devices.

The communication circuit 1010 may be embodied as any type of interface capable of interfacing the compute device 1000 with other compute devices, such as over one or more wired or wireless connections. In some embodiments, the communication circuit 1010 may be capable of interfacing with any appropriate cable type, such as an electrical cable or an optical cable. The communication circuit 1010 may be configured to use any one or more communication technology and associated protocols (e.g., Ethernet, Bluetooth®, Wi-Fi®, WiMAX, near field communication (NFC), etc.). The communication circuit 1010 may be located on silicon separate from the processor 1002, or the communication circuit 1010 may be included in a multi-chip package with the processor 1002, or even on the same die as the processor 1002. The communication circuit 1010 may be embodied as one or more add-in-boards, daughtercards, network interface cards, controller chips, chipsets, specialized components such as a field programmable gate array (FPGA) or application-specific integrated circuit (ASIC), or other devices that may be used by the compute device 1000 to connect with another compute device. In some embodiments, communication circuit 1010 may be embodied as part of a system-on-a-chip (SoC) that includes one or more processors, or included on a multichip package that also contains one or more processors. In some embodiments, the communication circuit 1010 may include a local processor (not shown) and/or a local memory (not shown) that are both local to the communication circuit 1010. In such embodiments, the local processor of the communication circuit 1010 may be capable of performing one or more of the functions of the processor 1002 described herein. Additionally or alternatively, in such embodiments, the local memory of the communication circuit 1010 may be integrated into one or more components of the compute device 1000 at the board level, socket level, chip level, and/or other levels.

The display 1012 may be embodied as any type of display on which information may be displayed to a user of the compute device 1000, such as a touchscreen display, a liquid crystal display (LCD), a thin film transistor LCD (TFT-LCD), a light-emitting diode (LED) display, an organic light-emitting diode (OLED) display, a cathode ray tube (CRT) display, a plasma display, an image projector (e.g., 2D or 3D), a laser projector, a heads-up display, and/or other display technology. The display 1012 may have any suitable resolution, such as 7680×4320, 3840×2160, 1920×1200, 1920×1080, etc.

In some embodiments, the compute device 1000 may include other or additional components, such as those commonly found in a compute device. For example, the compute device 1000 may also have peripheral devices 1014, such as a keyboard, a mouse, a speaker, an external storage device, etc. In some embodiments, the compute device 1000 may be connected to a dock that can interface with various devices, including peripheral devices 1014. The compute device 1000 may include several additional components, such as a battery, one or more antennas, one or more connectors (such as one or more USB2 connectors, one or more USB3 connectors, an SD card slot, a headphone and/or microphone jack, a power connector, etc.), etc. Each of those various components may be in the lid portion 102 and/or the base portion 104, as appropriate.

EXAMPLES

Illustrative examples of the technologies disclosed herein are provided below. An embodiment of the technologies may include any one or more, and any combination of, the examples described below.

Example 1 includes an apparatus comprising a chassis for a compute device, wherein one or more first openings are defined in a side surface of the chassis, wherein the one or more first openings are to provide access to one or more input/output ports, wherein one or more sets of second openings are defined in the side surface, wherein individual sets of second openings of the one or more sets of second openings are arranged around one of the one or more first openings; and one or more light-emitting diodes, wherein, when activated, light from the one or more light-emitting diodes passes through the one or more sets of second openings.

Example 2 includes the subject matter of Example 1, and further including one or more light pipes, wherein the one or more light pipes transport light from the one or more light-emitting diodes to the one or more sets of second openings.

Example 3 includes the subject matter of any of Examples 1 and 2, and wherein the one or more light pipes further transport light from the one or more light-emitting diodes to an area below a keyboard of the compute device to illuminate the keyboard.

Example 4 includes the subject matter of any of Examples 1-3, and wherein individual openings of the one or more sets of second openings are microholes with a diameters of 50-500 micrometers.

Example 5 includes the subject matter of any of Examples 1-4, and wherein the one or more light-emitting diodes emit light directly on the one or more sets of second openings without being transported by a light pipe.

Example 6 includes the subject matter of any of Examples 1-5, and further including one or more second light-emitting diodes, wherein the one or more second light-emitting diodes are different from the one or more light-emitting diodes, wherein the one or more second light-emitting diodes are to provide a backlight for a keyboard of the compute device.

Example 7 includes the subject matter of any of Examples 1-6, and further including a plurality of light-emitting diodes, the plurality of light-emitting diodes comprising the one or more light-emitting diodes, wherein individual light-emitting diodes of the plurality of light-emitting diodes correspond to one of the one or more first openings; and a plurality of dividers, wherein the plurality of dividers isolate individual openings of the one or more first openings from illumination from light-emitting diodes of the plurality of light-emitting diodes other than the light-emitting diode corresponding to the opening.

Example 8 includes the subject matter of any of Examples 1-7, and wherein the one or more light-emitting diodes are multicolor light-emitting diodes, wherein the compute device is to control a color of the one or more light-emitting diodes to indicate a status of one of the one or more input/output ports.

Example 9 includes the subject matter of any of Examples 1-8, and further including a plurality of transparent inserts, wherein the plurality of transparent inserts are to deflect light passing through the one or more sets of second openings.

Example 10 includes a compute device comprising a chassis, wherein a plurality of openings are defined in a side surface of the chassis; a keyboard comprising a plurality of keys; and one or more light-emitting diodes, wherein, when activated, light from individual light-emitting diodes of the one or more light-emitting diodes illuminate the plurality of keys for a user of the compute device and illuminate the plurality of openings for the user of the compute device.

Example 11 includes the subject matter of Example 10, and further including one or more light pipes, wherein the one or more light pipes transport light from the one or more light-emitting diodes to the plurality of openings.

Example 12 includes the subject matter of any of Examples 10 and 11, and wherein the one or more light pipes further transport light from the one or more light-emitting diodes to an area below a keyboard of the compute device to illuminate the keyboard.

Example 13 includes the subject matter of any of Examples 10-12, and wherein individual openings of the plurality of openings are microholes with a diameters of 50-500 micrometers.

Example 14 includes the subject matter of any of Examples 10-13, and wherein the one or more light-emitting diodes emit light directly on the plurality of openings without being transported by a light pipe.

Example 15 includes the subject matter of any of Examples 10-14, and further including one or more second light-emitting diodes, wherein the one or more second light-emitting diodes are different from the one or more light-emitting diodes, wherein the one or more second light-emitting diodes are to provide a backlight for a keyboard of the compute device.

Example 16 includes the subject matter of any of Examples 10-15, and wherein one or more input/output port openings are defined in a side surface of the chassis, further comprising a plurality of light-emitting diodes, the plurality of light-emitting diodes comprising the one or more light-emitting diodes, wherein individual light-emitting diodes of the plurality of light-emitting diodes correspond to one of the one or more input/output port openings; and a plurality of dividers, wherein the plurality of dividers isolate individual input/output ports openings from illumination from light-emitting diodes of the plurality of light-emitting diodes other than the light-emitting diode corresponding to the input/output port opening.

Example 17 includes the subject matter of any of Examples 10-16, and wherein the one or more light-emitting diodes are multicolor light-emitting diodes, wherein the compute device is to control a color of the one or more light-emitting diodes to indicate a status of individual input/output ports corresponding to individual input/output port openings of the one or more input/output port openings.

Example 18 includes the subject matter of any of Examples 10-17, and further including a plurality of transparent inserts, wherein the plurality of transparent inserts are to deflect light passing through the plurality of openings.

Example 19 includes a compute device comprising a chassis for a compute device, wherein one or more input/output port openings are defined in a side surface of the chassis, wherein, for individual input/output port openings of the one or more input/output port openings, a plurality of openings are defined in the side surface and arranged around the corresponding input/output port openings; and means for illuminating the plurality of openings corresponding to individual input/output port openings of the one or more input/output port openings.

Example 20 includes the subject matter of Example 19, and further including one or more light pipes, wherein the one or more light pipes transport light from means for illuminating to the plurality of openings corresponding to individual input/output port openings of the one or more input/output port openings.

Example 21 includes the subject matter of any of Examples 19 and 20, and wherein the one or more light pipes further transport light from the means for illuminating to an area below a keyboard of the compute device to illuminate the keyboard.

Example 22 includes the subject matter of any of Examples 19-21, and wherein individual openings of the plurality of openings corresponding to individual input/output port openings of the one or more input/output port openings are microholes with a diameters of 50-500 micrometers.

Example 23 includes the subject matter of any of Examples 19-22, and wherein the means for illuminating emit light directly on the plurality of openings corresponding to individual input/output port openings of the one or more input/output port openings without being transported by a light pipe.

Example 24 includes the subject matter of any of Examples 19-23, and further including a means for illuminating a keyboard of the compute device, wherein the means for illuminating the keyboard are different from the means for illuminating the plurality of openings corresponding to individual input/output port openings of the one or more input/output port openings.

Example 25 includes the subject matter of any of Examples 19-24, and wherein the means for illuminating are multicolor light-emitting diodes, wherein the compute device is to control a color of the means for illuminating to indicate a status of individual input/output ports corresponding to individual input/output port openings of the one or more input/output port openings.

Example 26 includes the subject matter of any of Examples 19-25, and further including a plurality of transparent inserts, wherein the plurality of transparent inserts are to deflect light passing through the plurality of openings corresponding to individual input/output port openings of the one or more input/output port openings.

Example 27 includes a method comprising determining, by a compute device, whether one or more light-emitting diodes should be activated, wherein the compute device comprises a chassis, wherein one or more input/output port openings are defined in a side surface of the chassis, wherein, for individual input/output port openings of the one or more input/output port openings, a plurality of openings are defined in the side surface and arranged around the corresponding input/output port openings; and activating the one or more light-emitting diodes to emit light that passes through the plurality of openings corresponding to individual input/output port openings of the one or more input/output port openings.

Example 28 includes the subject matter of Example 27, and wherein determining whether one or more light-emitting didoes should be activated comprises determining whether a trigger key was pressed.

Example 29 includes the subject matter of any of Examples 27 and 28, and wherein a trigger key is any key.

Example 30 includes the subject matter of any of Examples 27-29, and wherein a trigger key is a combination of two or more keys.

Example 31 includes the subject matter of any of Examples 27-30, and wherein determining whether one or more light-emitting didoes should be activated comprises determining whether a trigger sound was detected.

Example 32 includes the subject matter of any of Examples 27-31, and wherein determining whether one or more light-emitting didoes should be activated comprises determining whether a user is instructed to insert a plug into the compute device.

Example 33 includes the subject matter of any of Examples 27-32, and wherein activating the one or more light-emitting diodes comprises activating one or more light-emitting diodes that provide a backlight for a keyboard of the compute device.

The invention claimed is:

1. An apparatus comprising:
a chassis for a compute device, wherein one or more first openings are defined in a side surface of the chassis, wherein the one or more first openings are to provide access to one or more input/output ports, wherein one or more sets of second openings are defined in the side surface, wherein individual sets of second openings of the one or more sets of second openings are arranged around one of the one or more first openings;
one or more light-emitting diodes, wherein, when activated, light from the one or more light-emitting diodes passes through the one or more sets of second openings; and
a plurality of transparent inserts, wherein the plurality of transparent inserts are to deflect light passing through the one or more sets of second openings.

2. The apparatus of claim 1, further comprising one or more light pipes, wherein the one or more light pipes transport light from the one or more light-emitting diodes to the one or more sets of second openings.

3. The apparatus of claim 2, wherein the one or more light pipes further transport light from the one or more light-emitting diodes to an area below a keyboard of the compute device to illuminate the keyboard.

4. The apparatus of claim 1, wherein individual openings of the one or more sets of second openings are microholes with a diameters of 50-500 micrometers.

5. The apparatus of claim 1, wherein the one or more light-emitting diodes emit light directly on the one or more sets of second openings without being transported by a light pipe.

6. The apparatus of claim 1, further comprising one or more second light-emitting diodes, wherein the one or more second light-emitting diodes are different from the one or more light-emitting diodes, wherein the one or more second light-emitting diodes are to provide a backlight for a keyboard of the compute device.

7. The apparatus of claim 1, further comprising:
a plurality of light-emitting diodes, the plurality of light-emitting diodes comprising the one or more light-emitting diodes, wherein individual light-emitting diodes of the plurality of light-emitting diodes correspond to one of the one or more second openings; and
a plurality of dividers, wherein individual dividers of the plurality of dividers extend from the side surface of the chassis towards an interior of the chassis, wherein the plurality of dividers isolate individual openings of the one or more second openings from illumination from light-emitting diodes of the plurality of light-emitting diodes other than the light-emitting diode corresponding to the opening.

8. The apparatus of claim 7, wherein the one or more light-emitting diodes are multicolor light-emitting diodes, wherein the compute device is to control a color of the one or more light-emitting diodes to indicate a status of one of the one or more input/output ports.

9. The apparatus of claim 1, wherein the plurality of transparent inserts are to deflect light passing through the one or more sets of second openings in a downward direction toward a surface supporting the chassis.

10. A compute device comprising:
a chassis, wherein a plurality of openings are defined in a side surface of the chassis;
a keyboard comprising a plurality of keys; and
one or more light-emitting diodes, wherein, when activated, light from individual light-emitting diodes of the one or more light-emitting diodes illuminate the plurality of keys for a user of the compute device and illuminate the plurality of openings for the user of the compute device.

11. The compute device of claim 10, further comprising one or more light pipes, wherein the one or more light pipes transport light from the one or more light-emitting diodes to the plurality of openings.

12. The compute device of claim 11, wherein the one or more light pipes further transport light from the one or more light-emitting diodes to an area below a keyboard of the compute device to illuminate the keyboard.

13. The compute device of claim 10, wherein individual openings of the plurality of openings are microholes with a diameters of 50-500 micrometers.

14. The compute device of claim 10, wherein the one or more light-emitting diodes emit light directly on the plurality of openings without being transported by a light pipe.

15. The compute device of claim 10, wherein one or more input/output port openings are defined in a side surface of the chassis, further comprising:
a plurality of light-emitting diodes, the plurality of light-emitting diodes comprising the one or more light-emitting diodes, wherein individual light-emitting diodes of the plurality of light-emitting diodes correspond to one of the one or more input/output port openings; and
a plurality of dividers, wherein the plurality of dividers isolate individual input/output ports openings from illumination from light-emitting diodes of the plurality of light-emitting diodes other than the light-emitting diode corresponding to the input/output port opening.

16. The compute device of claim 15, wherein the one or more light-emitting diodes are multicolor light-emitting diodes, wherein the compute device is to control a color of the one or more light-emitting diodes to indicate a status of individual input/output ports corresponding to individual input/output port openings of the one or more input/output port openings.

17. The compute device of claim 10, further comprising a plurality of transparent inserts, wherein the plurality of transparent inserts are to deflect light passing through the plurality of openings.

18. A method comprising:
determining, by a compute device, whether one or more light-emitting diodes should be activated, wherein the compute device comprises a chassis, wherein one or more input/output port openings are defined in a side surface of the chassis, wherein, for individual input/output port openings of the one or more input/output port openings, a plurality of openings are defined in the side surface and arranged around the corresponding input/output port openings; and activating the one or more light-emitting diodes to emit light that passes through the plurality of openings corresponding to individual input/output port openings of the one or more input/output port openings.

19. The method of claim 18, wherein determining whether one or more light-emitting didoes should be activated comprises determining whether a trigger key was pressed.

20. The method of claim 18, wherein determining whether one or more light-emitting didoes should be activated comprises determining whether a trigger sound was detected.

* * * * *